Figure 5:
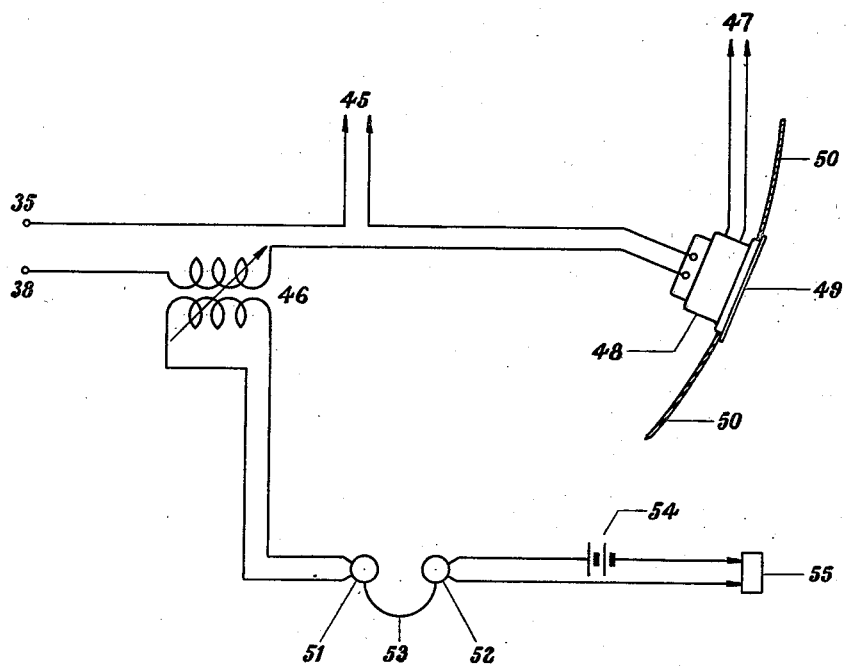

Nov. 20, 1928.
H. C. HAYES
1,692,119
METHOD FOR MEASURING DISTANCE
Original Filed Jan. 31. 1922    2 Sheets-Sheet 1
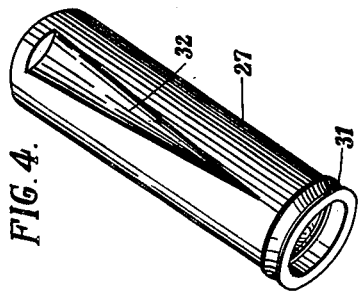
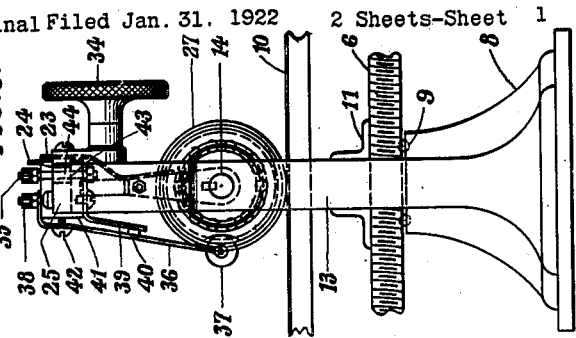
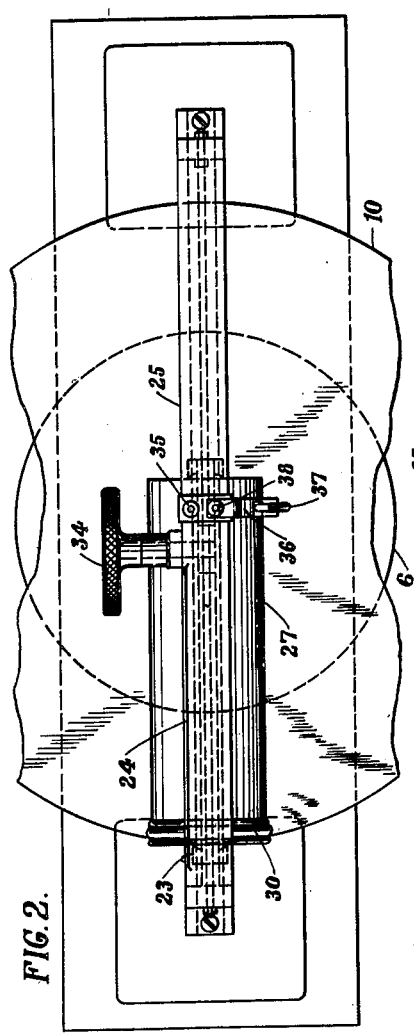
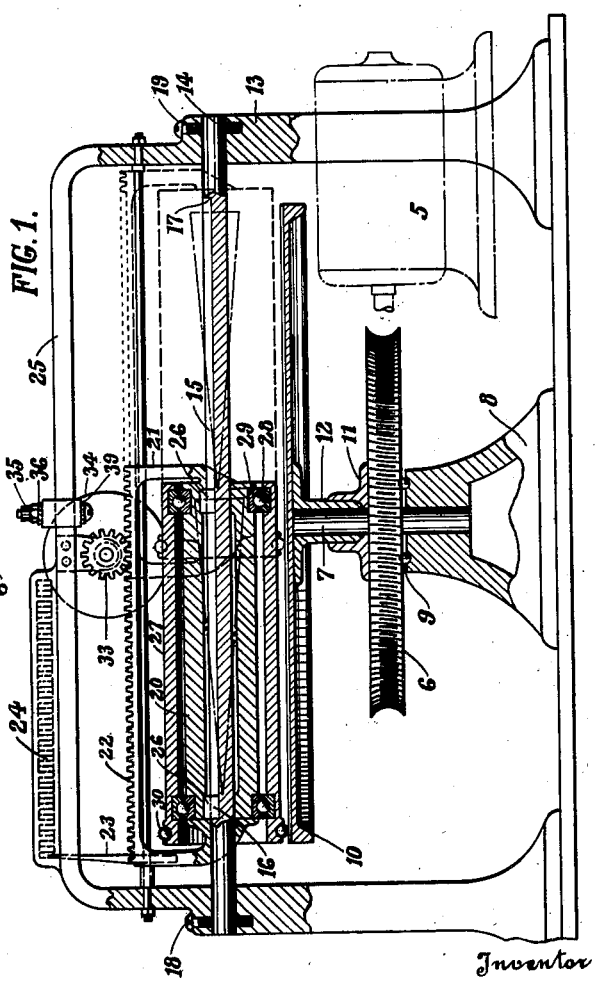
Inventor
HARVEY C. HAYES.
By John J. Fitzgerald
Attorney Patented Nov. 20, 1928.

1,692,119

UNITED STATES PATENT OFFICE.

HARVEY C. HAYES, OF WASHINGTON, DISTRICT OF COLUMBIA.

METHOD FOR MEASURING DISTANCE.

Original application filed January 31, 1922, Serial No. 533,092. Divided and this application filed August 12, 1924. Serial No. 731,578.

This is a divisional application filed in connection with my co-pending application, Serial No. 533,092, filed January 31, 1922.

My invention relates generally to a method of and apparatus for measuring distance, and more particularly to determining distance by measuring the time of sound traverse between two points.

An object of my invention is to determine with a high degree of accuracy the time of sound traverse between a sound source and a sound receiver.

Another object is to provide a device that is simple and reliable in operation, cheap to manufacture, and having a marked degree of efficiency.

With these and other objects in view the invention consists in the construction, combination, and arrangement of parts so as to utilize certain characteristics of sound as will be hereinafter described.

Reference is to be had to the accompanying drawings forming part of this specification in which like reference characters indicate corresponding parts throughout the several views, and in which Figure 1 is a sectional view of my device Figure 2 is a top view partially broken away Figure 3 is an end view partially broken away Figure 4 is a perspective view of the time regulating cylinder used therein, and Figure 5 is a simple diagram of the electrical circuits and elements.

The velocity with which sound travels in any homogeneous, ponderable medium is definite and determinable and, as a result, the distance between a sound source and a receiving station in a known medium can be determined by measuring the time required for a sound signal to travel between the two points.

My method of sound ranging is especially applicable to the determination of the distance from a sound source to a reflecting or echo producing surface, as by employing the echo, the source and the receiver can be located at the same station and the measurement of the time interval thus simplified and error reduced, as the time interval to be measured is doubled.

It has been found that most submarine surfaces, such as are furnished by rocks, ledges, precipitous coasts, icebergs and all kinds of sea bottom, are efficient reflectors of submarine sounds. Also because of the low viscosity, homogeneity, and relatively slow movement of sea water, it transmits sounds to great distances and with but slight bending or change of direction.

My method of sound ranging might be widely used as an aid and safeguard to navigation by enabling the navigator to take soundings as well as to determine the distance of his vessel from rocks, ledges, precipitous coasts, and icebergs. This is possible because of the simplicity with which the device may be operated on ship board by the ship's personnel.

It has been found that if arrangements are made so that of two sounds one stimulates one ear and the other stimulates the other ear then the simultaneity of the two can be judged to within from 1/200th to 1/1000th of a second—if two sounds are unlike—the accuracy of judgment depending upon the character and sharpness of the two sounds, but depending relatively little on the observer. If the two sounds are alike, as are sound and its echo, then the simultaneity can be judged to within 1/100,000th of a second. This phenomenon is due to the operation of the binaural sense.

Referring more particularly to Figure 1 of the drawings, 5 represents a motor adjustable to give and hold a desired speed, which drives a gear 6 mounted on a shaft 7. The drive mechanism between the motor and gear is not shown, as it may be of any conventional or desired construction and arrangement. Ball-bearings 9, arranged on the upper side of a pedestal 8 in which the shaft 7 is mounted, support the gear 6. To the free end of the shaft I fixedly secure, by any desired means, a disk 10, and housings 11 and 12 interposed between the gear and disk additionally support the latter.

A frame 13 has a bar 14, a portion of whose upper surface is cut away, as at 15, to provide stops 16 and 17 at either end, secured between its uprights as at 18 and 19. Between the stops I slidably mount a carriage 20 having a U shaped member 21 intergrally formed thereon, the cross bar of which is provided with a rack 22. One of the end bars of this U-shaped member has secured thereto a pointer 23 which is movable along a scale 24 secured to the cross bar 25 of the frame 13. Stopping blocks 26 secured within the carriage are adapted to engage with the stops 16 and 17 to limit the movement thereof. A cylinder 27 rotatably surrounds the carriage 20 and is supported therefrom by ball-bearings 28 mounted in bearings 29 carried by both the cylinder and carriage. One end of the cylinder is enlarged and has a ring 30, preferably of fibre, fitted in a groove 31 and engaging with the disk 10 whereby motion is imparted to the cylinder. Extending longitudinally of the cylinder there is a triangular-shaped recess 32, having its larger end the more remote from the enlarged cylinder head.

To vary the speed of the cylinder by moving it radially inward or outward along the disk I use a pinion gear 33 meshing with the rack 22, the gear being operable through a thumb knob 34.

The mechanism operating an oscillatory circuit, illustrated in Fig. 5, connected to the binding posts 35 and 38, consists of a breaker arm 36, rider wheel 37, stationary arm 39, and contact 40. The arm 36 is electrically connected with the binding post 38 and is resiliently connected to an insulating block 41 by a screw 42 or other suitable means, while the arm 39 is electrically connected with the binding post 35 through the stud 43 which passes through a suitable insulated housing 44 mounted within the cross bar 25. The contacts are normally held open by the rider wheel, but are closed for an instant during each revolution of the cylinder when the wheel drops into the recess. It will thus be observed that the oscillatory circuit is closed for an instant every time the cylinder revolves, and since the speed of the cylinder can be varied uniformly the interval between the signals can be given any value between infinity and a certain minimum, but as the larger end of the recess is towards the center of the disk, where rapid movement is imparted to the cylinder, the length of the signal remains approximately constant. A signal having a regulable period of constant duration, wholly independent of changes in signal periodicity, is highly advantageous in permitting an absolute coincidence in point of time, between echo and primary impulses when the latter are combined in a common receptive means, such as I have disclosed. It is apparent, that the triangular recess, constitutes a simple expedient for limiting the length of signal to a definite time duration when cylinder 27, in being adjusted for echo-signal coincidence, has been moved toward the center of disk 10, its angular velocity being decreased, which, in the absence of a recess having tapered width, would cause contacts 39 and 40 to remain closed for an indefinitely long period.

Fig. 5 shows one arrangement of the oscillating circuit and the receiver. A source of alternating current 45, having preferably a frequency to give a musical note, supplies a winding on the core 48 which is permanently magnetized by a source of direct current 47. The field set up acts on the diaphragm 49 in contact with water, as for instance being set in the skin 50 of a ship, causing it to vibrate when the circuit is closed through contact 40 (Fig. 3). One ear piece 51 of a telephone set 53 is coupled to the oscillating circuit through an adjustable coupling 46, the other ear piece 52 being in circuit with a microphone detector 55, arranged to receive incoming wave energy from the water.

The operation of my invention is as follows:

The local signal is brought to one ear piece of a two telephone head set by an inductive connection between a receiver circuit and the oscillatory circuit, operated by the contact 40. The other receiver is actuated by the echo of the signal received on a submarine sound receiver. The listener now adjusts the carriage 20 and cylinder 27 along the disk 10 by the thumb knob 34 until the signal and echo arrive at the two ears simultaneously; that is, the echo of a signal already made arrives at the same time as the next succeeding signal; or it would be possible to have the echo arrive at the same time as the second or third succeeding signal in which case the time of travel of the sound would be two or three times that of one revolution of the cylinder. The time, interval or period, if the scale is calibrated in such unit, may be read off directly by means of the pointer 23 which moves over the scale 24, or the scale may be calibrated directly in fathoms, yards, or any other desired unit.

While the foregoing description takes care of sound ranging where an echo from the signals can be had, the apparatus can be made suitable for observations where no echo is available. For instance, in Fig. 5 the line connecting the microphone 55 with the ear piece 52 may be a long time connecting two widely separated points, the distance between which is known, thus giving a means for measuring velocity. Since the velocity of the electrical effects in the circuit will be extremely high, the time of return of the signal from the distant microphone to the ear piece will be negligible for all practical purposes. Or the two stations could be connected by radio means to transfer the generated signals to the receiving point or the received signal to the generating point.

While I have described my invention as a means for determining distance, it may be equally well used for obtainnig other data, such as determining velocity of sound, if the range is known.

It will be understood that the above description and accompanying drawings comprehend only the general and preferred embodiment of my invention and that various minor changes in details of construction, proportion, and arrangement of parts may be made within the scope of the appended claims and without sacrificing any of the advantages of my invention.

Having fully described my invention, what I desire to secure by Letters Patent is:

1. The method of taking soundings which consists of imparting a succession of sound signals to the water to produce echoes from the sea bottom, directly activating one receiver at an instant simultaneous in time with the transmitted signal, activating a second receiver with the echoes of said signals, and adjusting the periodicity of said succession of signals while maintaining the duration of signal at constant length, to value such that the two receivers are activated simultaneously.

2. The method of sound ranging which consists of imparting a succession of sound signals to a homogeneous medium to produce echoes from an object the range of which is being measured, directly activating one receiver at an instant simultaneous in time with the transmitted signal activating a second receiver with the echoes of said signals, and adjusting the periodicity of said succession of signals while maintaining the duration of signal at constant length, until both receivers are activated simultaneously, the periodicity of the signals constituting an indicium of the distance desired.

3. The method of determining the time measure of sound propagation over distances which consists of generating a succession of sound signals, activating one receiver with said signals at the same instant they occur, receiving said signals after propagation and return over distance to be measured, activating a second receiver with the signals at the same instant they are received, and adjusting the periodicity of said succession of signals while maintaining the duration of signal at constant length, until both receivers are activated simultaneously the adjusted periodicity constituting the time of travel of the propagated sound to the objective and return over the path of the distance to be measured.

HARVEY C. HAYES.